(12) United States Patent
Tan et al.

(10) Patent No.: US 9,512,390 B2
(45) Date of Patent: Dec. 6, 2016

(54) LIQUID CATALYZING SYSTEM

(71) Applicant: Gold NanoTech Inc, Taipei (TW)

(72) Inventors: Shan-Wen Tan, Taipei (TW);
Chia-Nan Chen, New Taipei (TW);
Cheng-Yuh Tsai, New Taipei (TW)

(73) Assignee: GOLD NANOTECH INC. (TW)

( * ) Notice: Subject to any disclaimer, the term of this patent is extended or adjusted under 35 U.S.C. 154(b) by 279 days.

(21) Appl. No.: 14/547,253

(22) Filed: Nov. 19, 2014

(65) Prior Publication Data

US 2016/0108349 A1      Apr. 21, 2016

(30) Foreign Application Priority Data

Oct. 20, 2014   (TW) .............................. 103136176 A

(51) Int. Cl.
| | |
|---|---|
| *C12H 1/14* | (2006.01) |
| *C12H 1/22* | (2006.01) |
| *C12J 1/00* | (2006.01) |
| *C12J 1/10* | (2006.01) |
| C12H 1/044 | (2006.01) |
| C12H 1/02 | (2006.01) |
| C12H 1/04 | (2006.01) |

(52) U.S. Cl.
CPC ....... *C12H 1/14* (2013.01); *C12H 1/22* (2013.01); *C12J 1/00* (2013.01); *C12J 1/10* (2013.01); *C12H 1/02* (2013.01); *C12H 1/04* (2013.01); *C12H 1/0408* (2013.01)

(58) Field of Classification Search
CPC ........... C12H 1/14; C12H 1/22; C12H 1/0408; C12H 1/04; C12H 1/02; C12J 1/10; C12J 1/00

USPC .............. 99/277.1, 277, 279, 280, 283, 298, 299,99/317, 307, 305, 308
See application file for complete search history.

(56) References Cited

U.S. PATENT DOCUMENTS

| | | | | |
|---|---|---|---|---|
| 2,109,151 A | * | 2/1938 | Krause ..................... | C12N 1/16 426/247 |
| 2,196,193 A | * | 4/1940 | Chambers ................ | C12H 1/16 204/157.62 |
| 2,487,594 A | * | 11/1949 | Rudnick ................ | C12G 3/065 426/124 |
| 4,994,289 A | * | 2/1991 | Yu ............................ | C12H 1/16 426/330.4 |
| 5,271,161 A | * | 12/1993 | Brinck, II ................ | C12H 1/22 34/105 |
| 5,543,087 A | * | 8/1996 | Lee ....................... | B01D 33/067 210/220 |
| 5,860,353 A | * | 1/1999 | Ceccarani ................ | C12H 1/16 99/277.1 |

(Continued)

*Primary Examiner* — Sean Michalski

(57) ABSTRACT

The present invention provides a liquid catalyzing system for aging a liquid, such as alcoholic liquid, vinegar and soy sauce. In the present invention, a plurality of nano metal flakes are adopted as the catalyst and a liquid catalyzing system is particularly designed in the present invention for rapidly aging the liquid. By using the liquid catalyzing system, the liquid can be evenly mixed with the nano metal flakes in a reaction space constructed by a framework and a filter; in addition, a disturb gas is inputted to the reaction space through a gas circulation loop connecting with the framework for treating a liquid flow disturbance to the liquid and the nano metal flakes, so as to accelerate a catalytic reaction resulted from the nano metal flakes to the liquid.

14 Claims, 6 Drawing Sheets

(56) References Cited

U.S. PATENT DOCUMENTS

| | | | | |
|---|---|---|---|---|
| 7,220,439 | B2* | 5/2007 | Leonhardt | C12H 1/165 426/15 |
| 7,344,646 | B2* | 3/2008 | Flick | C02F 1/481 210/222 |
| 7,998,350 | B2* | 8/2011 | Flick | B03C 1/288 210/222 |
| 2005/0033071 | A1* | 2/2005 | Tatsumi | C07C 67/03 554/176 |
| 2008/0175951 | A1* | 7/2008 | Rule | C12G 1/02 426/15 |
| 2009/0291175 | A1* | 11/2009 | Wei | C12H 1/003 426/422 |
| 2010/0000416 | A1* | 1/2010 | Mulhauser | A47J 31/0573 99/306 |
| 2014/0314930 | A1* | 10/2014 | Nassief | C12H 1/22 426/519 |
| 2015/0001164 | A1* | 1/2015 | Parkansky | C02F 1/722 210/748.16 |
| 2015/0143998 | A1* | 5/2015 | Malher-Besse | B27N 5/00 99/277.1 |
| 2015/0337248 | A1* | 11/2015 | Davis | C12G 3/065 426/248 |
| 2016/0040106 | A1* | 2/2016 | May | C12H 1/14 99/277.1 |
| 2016/0097695 | A1* | 4/2016 | Maker | C12H 1/22 73/40 |

* cited by examiner

LIQUID CATALYZING SYSTEM

BACKGROUND OF THE INVENTION

1. Field of the Invention

The present invention relates to the technology field of catalytic equipment, and more particularly to a liquid catalyzing system using a plurality of nano metal flakes as a catalyst for accelerating the ripening of a specific liquid, such as wine, vinegar and soy sauce.

2. Description of the Prior Art

Nanoparticle is a micro solid grain constituted by dozens of atoms to hundreds of atoms and includes very special physical and chemical characteristics. The electronic structure of the nanoparticle is different from other small particles because the electronic structure of the nanoparticle shows high-percentage surface atom number; so that, the nanoparticles can not only be used as a homogeneous catalyst, but also be taken as a heterogeneous catalyst.

With the booming development of the researches in nano materials, the applications of nano catalysts are getting wider. Currently, the definitions of the nano catalysts are divided into two kinds of (1) defining by particle diameter and (2) defining by pore diameter. In which, the first-kind definition means the particles having the diameter smaller than 100 nm can be applied as a nano catalyst. Moreover, for the second-kind definition, zeolite is one of the representative nano catalysts because the zeolite includes a plurality of pores with nano-level diameter.

Nowadays, nano catalysts are divided into nano metal catalysts and nano metal oxide catalysts, wherein the nano metal oxide catalysts can also be used as a supporting carrier for the nano metal catalysts. Besides, the nano metal catalysts are further divided into the catalysts with supporting carrier and the nano metal catalysts without supporting carrier. For instance, nano nickel particles are one kind of the catalysts with supporting carrier used for accelerating the liquid-phase hydrogenation. Moreover, the nano nickel particles can also be applied as the catalyst for accelerating the hydrogenation of a vegetable oil. However, because the nano nickel particles (i.e., the catalyst without supporting carrier) have no any supporting carriers, a portion of the nano nickel particles would gather on the inner wall of the catalytic reactor when the catalytic reaction is executed. That is the primary drawback of the catalysts without supporting carrier in application.

The conventional carriers for supporting the catalysts include alumina, silicon oxide, activated carbon, graphite, and zeolite. When one nano metal catalyst is supported by a specific carrier, the particles of the nano metal catalyst would be kept highly distributing, such that the nano metal particles are avoided from gathering on the inner wall of the catalytic reactor when the catalytic reaction is executed.

Fermented alcoholic liquid is the product of treating a specific raw material (such as wheat) with a fermentation process so as to transform the sugar ingredients (especially for starch) in the wheat to ethanol. However, some byproducts differing from the ethanol would be concomitantly produced during the fermentation process, such as organic acid, fusel, methanol, acetaldehyde, and esters. In the byproducts, esters are the aroma source of the alcoholic liquid, but the organic acid, fusel and methanol would induce some side effects including disturbing spirit flavor, resulting in drinker's hangover, causing heavy metabolic burden to drinker's liver, et cetera. So that, spirit and wine manufactures have developed many catalyzing techniques for accelerating the ripening of the fermented alcoholic liquid, wherein some catalyzing techniques use nano gold particles as an important catalyst for rapidly aging the fermented alcoholic liquid.

Please refer to FIG. 1, which illustrate a framework diagram of a conventional equipment for aging alcoholic liquids. As shown in FIG. 1, the equipment for aging alcoholic liquids consists of: a storage cask 10' provided with a nano gold target 30' thereinside, a circulation pump 12', and a circulation loop 11'. To age a specific alcoholic liquid 20' in the storage cask 10', the circulation pump 12' is operated to make the alcoholic liquid 20' flows cyclically through the circulation loop 11', so as to enhance the contact frequency between the alcoholic liquid 20' and the nano gold particles carried by the nano gold target 30'. Therefore, the formaldehyde, acetaldehyde and fusel in the alcoholic liquid 20' would be oxidized to organic acids by the nano gold catalyst; moreover, the nano gold catalyst would further accelerate the esterification reaction of the organic acids, so as to complete the alcoholic liquid's ripening.

However, because the nano gold target 30' used in the equipment for aging alcoholic liquids shown by FIG. 1 is fabricated by sputtering the nano gold particles onto a non-woven cloth (i.e., a carrier of the nano gold particles), the equipment for aging alcoholic liquids shown by FIG. 1 reveals some drawbacks under operation. The person skilled in the technology fields of liquid catalyzing equipment is able to know that the effective reaction area of the nano catalyst with supporting carrier is limited and smaller than the nano catalyst without supporting carrier. Besides, when the alcoholic liquid 20' constantly flows through the circulation pump 12' and the circulation loop 11', a portion of the nano gold particles attached on the non-woven cloth would separate from the non-woven cloth, and then mix with the alcoholic liquid 20'.

Accordingly, in view of the conventional equipment for aging alcoholic liquids still include drawbacks, the inventor of the present application has made great efforts to make inventive research thereon and eventually provided a liquid catalyzing system.

SUMMARY OF THE INVENTION

The primary objective of the present invention is to provide a liquid catalyzing system for aging a liquid, such as alcoholic liquid, vinegar and soy sauce. Differing from conventional catalyzing systems using nano metal catalysts with supporting carrier or nano metal catalysts without supporting carrier to accomplish the catalytic reaction for the liquid, a plurality of nano metal flakes are adopted as an important catalyst and a novel liquid catalyzing system is particularly designed in the present invention for rapidly aging the liquid. By using the liquid catalyzing system, the liquid can be evenly mixed with the nano metal flakes in a reaction space constructed by a framework and a filter of the novel liquid catalyzing system; in addition, a disturb gas is inputted to the reaction space through a gas circulation loop connecting with the framework for treating a liquid flow disturbance to the liquid and the nano metal flakes, so as to effectively accelerate a catalytic reaction resulted from the nano metal flakes to the liquid.

Accordingly, in order to achieve the primary objective of the present invention, the inventor of the present invention provides a liquid catalyzing system for aging a liquid, comprising:

a liquid aging cask, used for storing the liquid, and having an installing opening and a liquid outputting port on the top and the bottom, respectively;

a framework, disposed in the liquid aging cask through the installing opening, and having a top end and a bottom end, wherein a plurality of nano metal flakes are disposed in the internal of the framework; moreover, the thickness of the nano metal flake is less than 200 nm, and the geometry size of the nano metal flake being greater than 0.1 μm²;

a filter, attached onto the framework by covering way, and having a filter area less than 0.1 μm² for blocking the nano metal flakes from getting out of the framework with the flowing of the liquid;

a first buffer trough, connected to the installing opening by the outer bottom thereof; wherein the first buffer trough has a first buffer space, and a through hole is provided on the bottom of the first buffer space;

a liquid filling member, disposed in the first buffer space of the first buffer trough, and comprising: a second buffer trough; and a first liquid filling tube having a first end and a second end, wherein the first end passes through the second buffer trough from the bottom of the second buffer trough, so as to expose in a second buffer space of the second buffer trough; moreover, the second end is communicated with the framework via the through hole; in addition, the portion of the first end exposing out in the second buffer space being provided with a plurality of liquid filling holes thereon;

a cover, disposed on the first buffer trough for sheltering the first buffer space and the liquid filling member, and having an operation opening;

a liftable cover, disposed on the cover for covering the operation opening, wherein a second liquid filling tube is disposed on the liftable cover;

a circulation pump, connected to the second liquid filling tube and the liquid output port through a liquid input tube and a liquid output tube of a liquid circulation loop, respectively; and a gas circulation loop, comprising: a gas input tube, passing through the liquid aging cask so as to connect with a tube connecting member formed on the bottom end of the framework, and a gas output tube, disposed on one side of the liquid aging cask, wherein the disposing height of the gas output tube is relatively higher than the height of a liquid level for the liquid stored in the liquid aging cask;

wherein by the operation of the circulation pump, the liquid stored in the liquid aging cask would be discharged via the liquid outputting port and the liquid output tube, and then the discharged liquid would be further filled into the second buffer space of the second buffer through the liquid input tube and the second liquid filling tube; therefore, the liquid accommodated in the second buffer space of the second buffer through would flow through the liquid filling holes formed on the first end of the first liquid filling tube, so as to flow into the framework; moreover, a disturb gas can be filled into the framework via the gas input tube and the tube connecting member, and then the filled disturb gas would treat a liquid flow disturbance to the liquid and the nano metal flakes in the framework, so as to accelerate a catalytic reaction resulted from the nano metal flakes to the liquid; therefore, the disturb gas would be discharged from the liquid aging cask through the gas output tube.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a liquid catalyzing system according to the present invention, embodiments of the present invention will be described in detail with reference to the attached drawings hereinafter.

Figure 1:
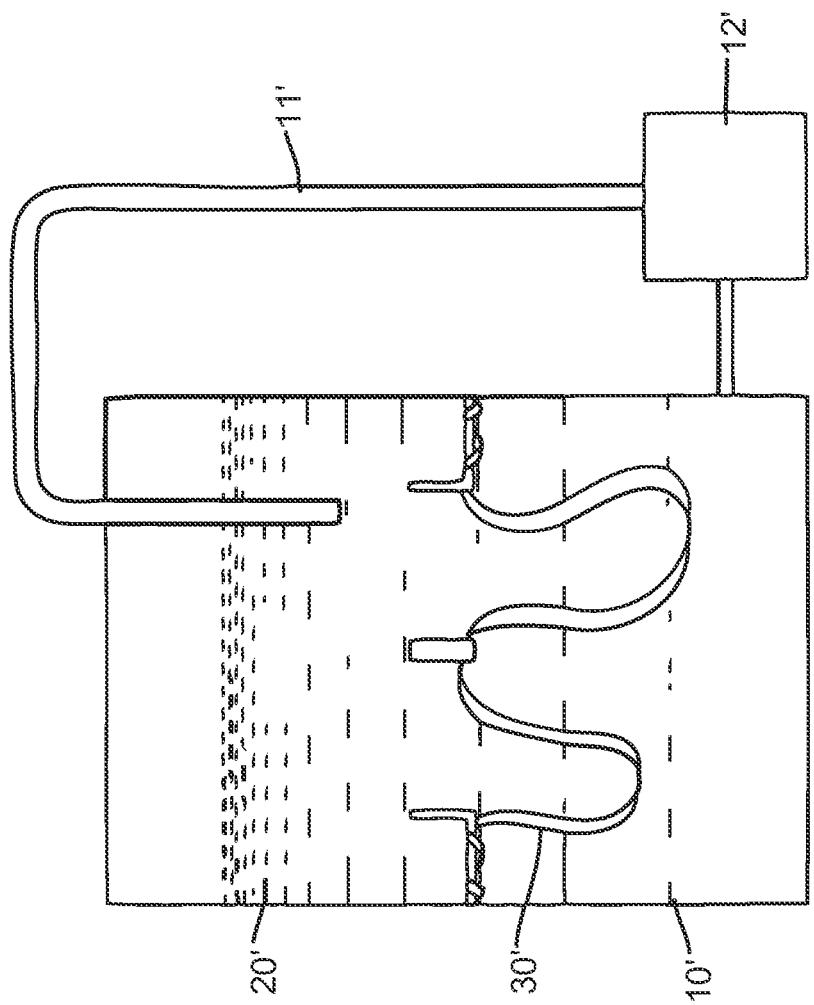
FIG. 1 is a framework diagram of a conventional equipment for aging alcoholic liquids
Figure 2:
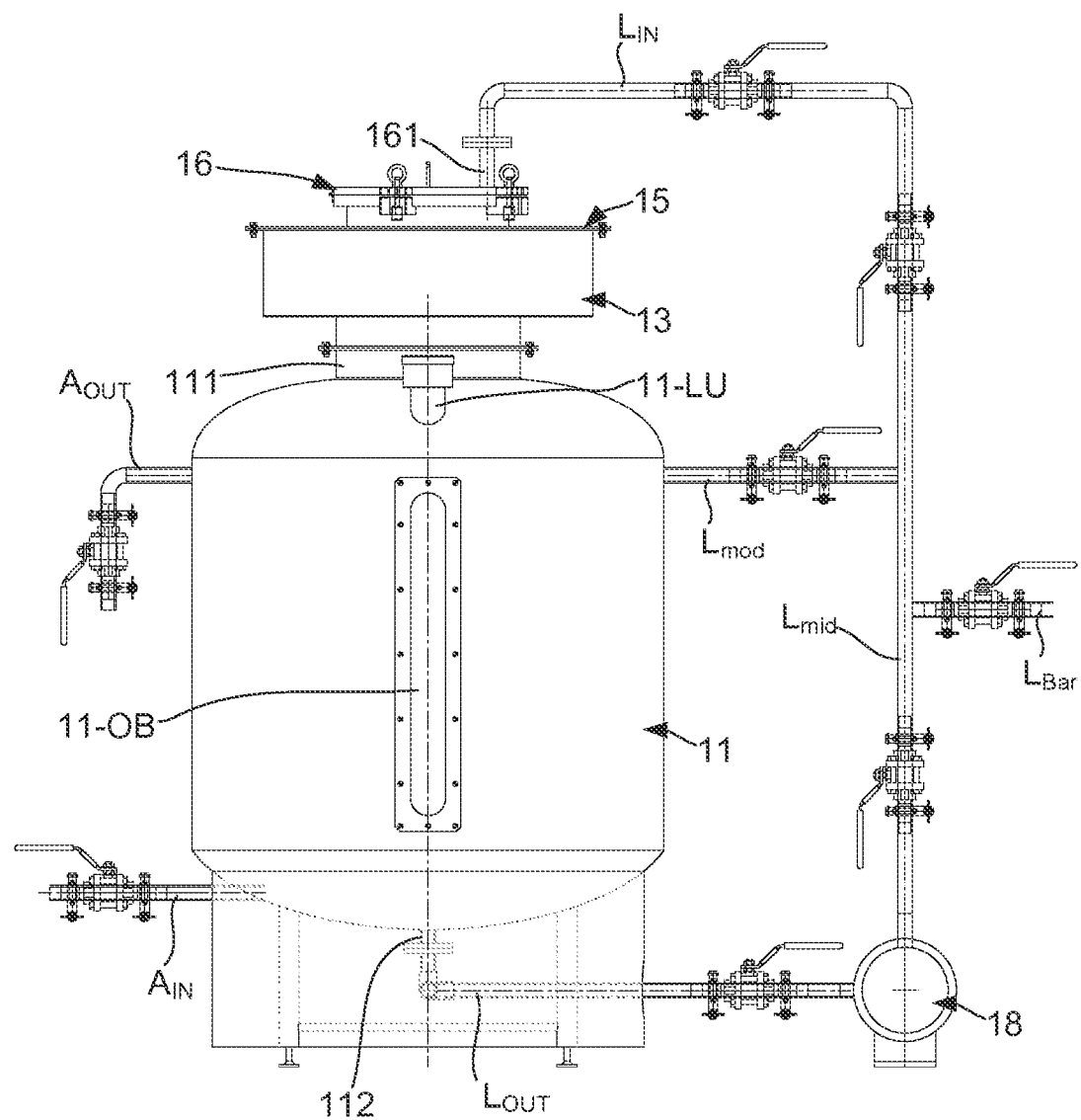
FIG. 2 is a framework diagram of a liquid catalyzing system according to the present invention.
Figure 3:
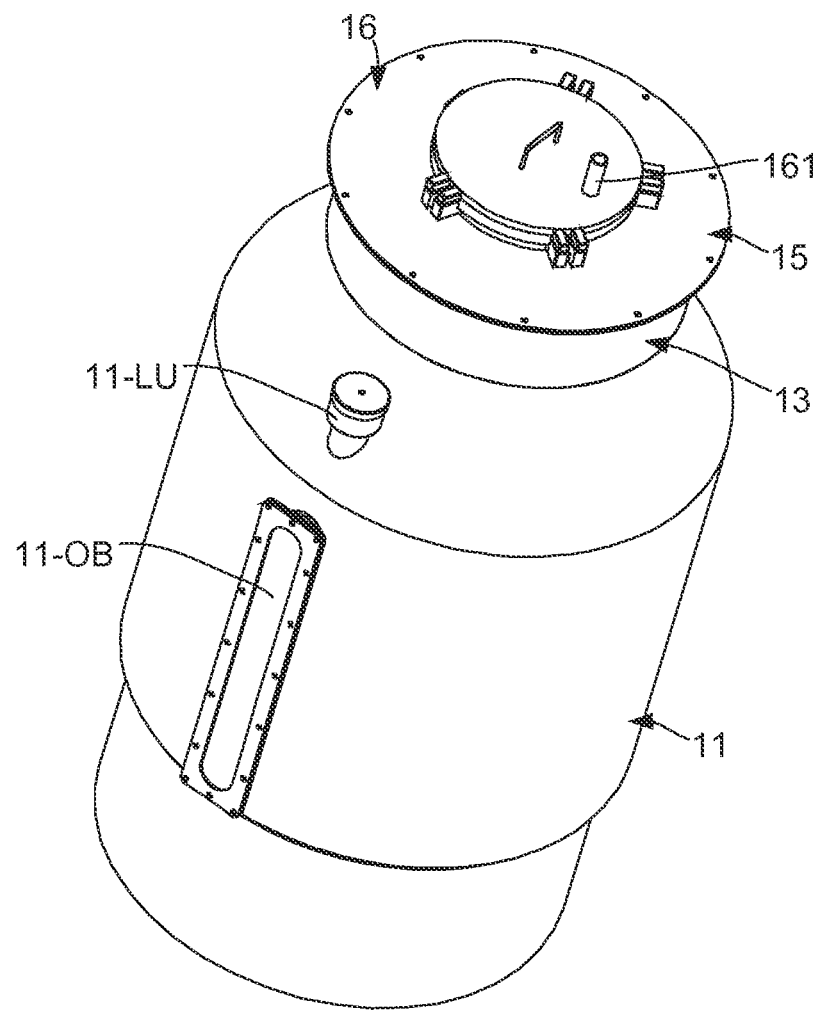
FIG. 3 is a stereo diagram of a liquid aging cask of the liquid catalyzing system.
Figure 4:
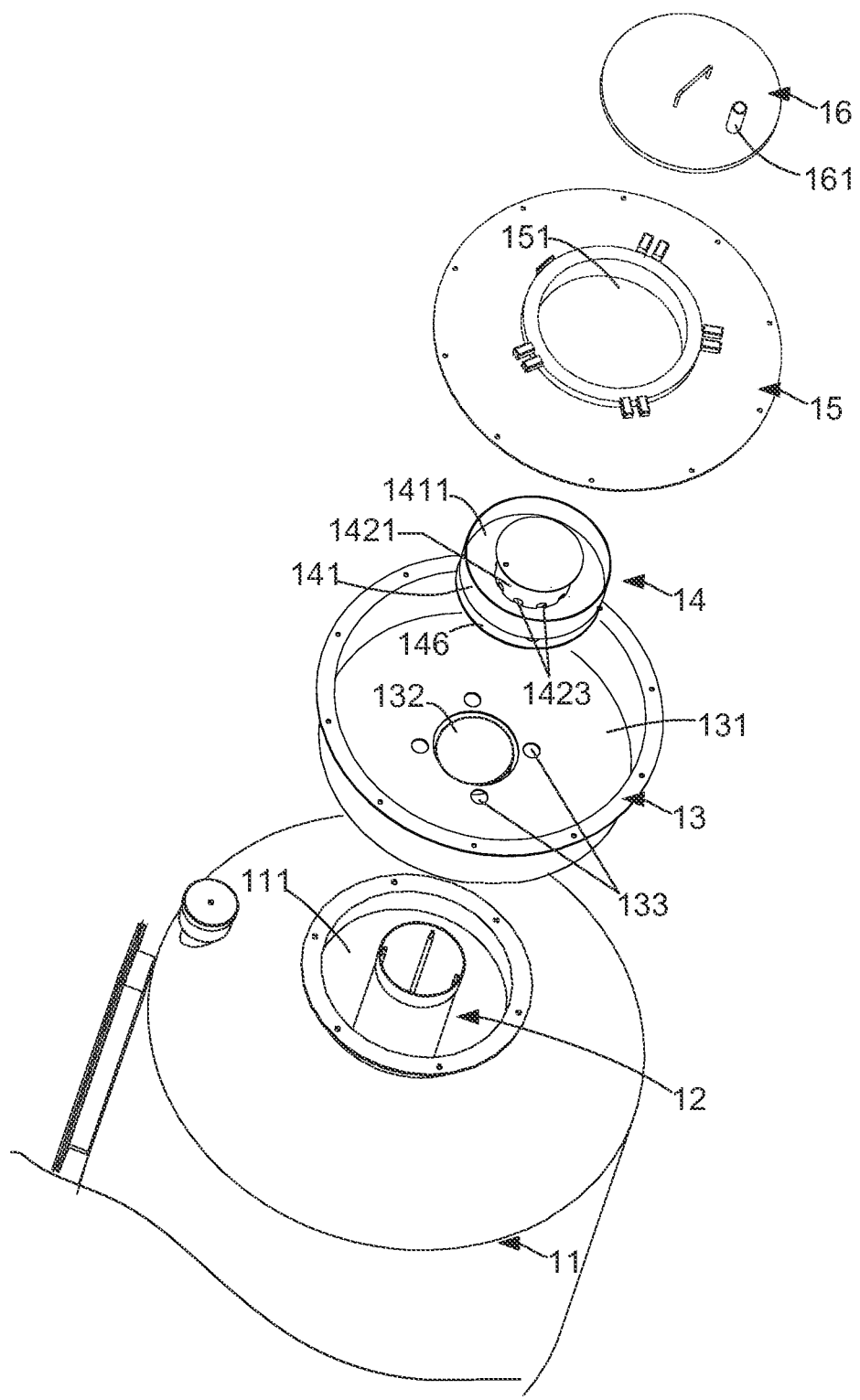
FIG. 4 is a stereo diagram of a first buffer trough, a liquid filling member, a cover, a liftable cover and the liquid aging cask of the liquid catalyzing system.
Figure 5:
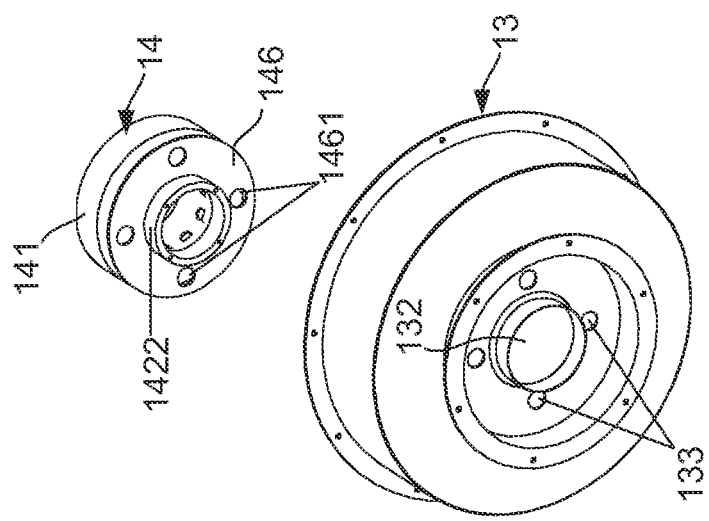
FIG. 5 shows an another angle-view stereo diagram of the first buffer trough and the liquid filling member of the liquid catalyzing system.
Figure 6:
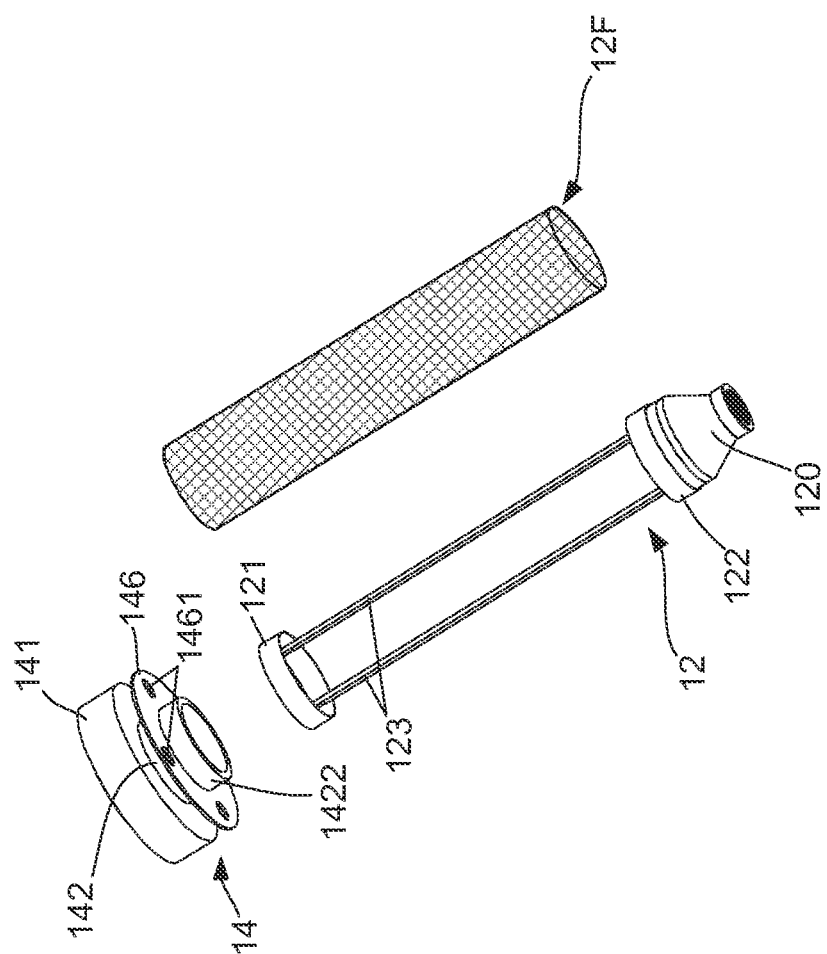
FIG. 6 is a stereo diagram of a framework, a filter and the liquid filling member of the liquid catalyzing system.

Please simultaneously refer to FIG. 2, FIG. 3, FIG. 4, FIG. 5, and FIG. 6, wherein FIG. 2 illustrates a framework diagram of a liquid catalyzing system according to the present invention, and FIG. 3 shows a stereo diagram of the liquid aging cask of the liquid catalyzing system. In addition, FIG. 4 depicts a stereo diagram of a first buffer trough, a liquid filling member, a cover, a liftable cover and the liquid aging cask of the liquid catalyzing system, and FIG. 5 shows an another angle-view stereo diagram of the first buffer trough and the liquid filling member. Moreover, FIG. 6 illustrates a stereo diagram of a framework, a filter and the liquid filling member of the liquid catalyzing system.

As shown in FIGS. 2-6, the liquid catalyzing system of the present invention consists of: a liquid aging cask 11, a framework 12, a filter 12F, a first buffer trough 13, a liquid filling member 14, a cover 15, a liftable cover 16, a circulation pump 18, a liquid circulation loop, and a gas circulation loop. The liquid catalyzing system proposed by the present invention is used for aging a specific liquid, such as alcoholic liquid, vinegar and soy sauce.

For the liquid catalyzing system, the liquid aging cask 11 is used for storing the liquid, wherein the liquid aging cask 11 has an installing opening 111 and a liquid outputting port 112 on the top and the bottom thereof, respectively. As shown in FIG. 4 and FIG. 6, the framework 12, disposed in the liquid aging cask 11 through the installing opening 111, is constituted by an upper supporting ring 121, a lower supporting ring 122 and a plurality of supporting rods 123 connected between the upper supporting ring 121 and the lower supporting ring 122; wherein the lower supporting ring 122 is further connected with a tube connecting member 120. In the present invention, a plurality of nano metal flakes are disposed in the internal of the framework 12 for being as a catalyst; particularly, the thickness of the nano metal flake is less than 200 nm, and the geometry size of the nano metal flake being greater than 0.1 μm². Moreover, in order to block the nano metal flakes from getting out of the framework 12 with the flowing of the liquid, the filter having a filter area less than 0.1 μm² is attached onto the framework by covering way.

Herein, it needs to further explain that the said nano metal flake is stacked by a plurality of nano metal particles having a particular size ranged from 2 nm to 30 nm, and the nano metal particles are made of a high purity metal material through a physical vapor deposition (PVD) process. According to the difference of the liquid to be aged, the high purity metal material can be gold (Au), silver (Ag) or platinum (Pt).

As shown in FIGS. 2-6, the first buffer trough 13 is connected to the installing opening 111 by the outer bottom thereof; wherein the first buffer trough 13 has a first buffer space 131, and a through hole 132 is provided on the bottom of the first buffer space 131. Opposite to the first buffer trough 13, the liquid filling member 14 disposed in the first buffer space 131 consists of a second buffer trough 141 and a first liquid filling tube 142. As the FIGS. 5-6 show, a first end 1421 of the first liquid filling tube 142 passes through the second buffer trough 141 from the bottom of the second buffer trough 141, so as to expose in a second buffer space 1411 of the second buffer trough 141; moreover, the second end 1422 of the first liquid filling tube 142 is communicated with the framework 12 via the through hole 132. Particularly, the portion of the first end 1421 exposing out in the second buffer space 1411 is provided with a plurality of liquid filling holes 1423 thereon.

The cover 15, disposed on the first buffer trough 13 and provided with an operation opening 151, is used for sheltering the first buffer space 131 and the liquid filling member 14. Moreover, the liftable cover 16 is disposed on the cover 15 for covering the operation opening 151, wherein a second liquid filling tube 161 is disposed on the liftable cover 16. The circulation pump 18 is connected to the second liquid filling tube 161 and the liquid output port 112 through a liquid input tube $L_{IN}$ and a liquid output tube $L_{OUT}$ of a liquid circulation loop, respectively. In addition, a gas input tube $A_{IN}$ of the gas circulation loop passing through the liquid aging cask 11 so as to connect with a tube connecting member 120 formed on the bottom end of the framework 12, and a gas output tube $A_{OUT}$ of the gas circulation loop is disposed on one side of the liquid aging cask 11, wherein the disposing height of the gas output tube $A_{OUT}$ is relatively higher than the height of a liquid level for the liquid (such as alcoholic liquid) stored in the liquid aging cask 11.

Therefore, through above descriptions, the constituting elements of the liquid catalyzing system proposed by the present invention have been introduced. Next, the technique features and functions of this liquid catalyzing system will be explained as follows.

As shown in FIGS. 2-6, by the operation of the circulation pump 18, the liquid stored in the liquid aging cask 11 would be discharged via the liquid outputting port 112 and the liquid output tube $L_{OUT}$, and then the discharged liquid would be further filled into the second buffer space 1411 of the second buffer 141 through the liquid input tube $L_{IN}$ and the second liquid filling tube 161; therefore, the liquid accommodated in the second buffer space 1411 of the second buffer 141 would flow through the liquid filling holes 1423 formed on the first end 1421 of the first liquid filling tube 142, so as to flow into the framework 12.

Inheriting to above descriptions, after the liquid is filled into the framework 12, a disturb gas can be filled into the framework 12 via the gas input tube $A_{IN}$ and the tube connecting member 120, and then the filled disturb gas would treat a liquid flow disturbance to the liquid and the nano metal flakes in the framework 12, so as to accelerate a catalytic reaction resulted from the nano metal flakes to the liquid. Eventually, the disturb gas would be discharged from the liquid aging cask 11 through the gas output tube $A_{OUT}$. After the catalytic reaction of the liquid (such as the alcoholic liquid) is carried out, the formaldehyde, acetaldehyde and fusel in the alcoholic liquid would be oxidized to organic acids by the nano metal flakes; moreover, the nano metal flakes would further accelerate the esterification reaction of the organic acids, so as to complete the alcoholic liquid's ripening and enhance the quality and sweet fragrance of the alcoholic liquid.

Furthermore, in order to increase the performance of the liquid catalyzing system proposed by the present invention, a plurality of first differential liquid filling holes 133 are disposed on the bottom of the first buffer space 131 and surround the through hole 132. Moreover, as shown in FIG. 4 and FIG. 5, the liquid filling member 14 further includes a liquid filling plate 146 disposed on the first liquid filling tube 142 and adjacent to the second buffer trough 141, wherein the liquid filling plate 146 is provided with a plurality of second differential liquid filling holes 1461 thereon.

By the disposing of the first differential liquid filling holes 133 and the second differential liquid filling holes 1461, when the excessively-filled liquid in the second buffer space 1411 overflows into the first buffer space 131, to rotate the liquid filling member 14 by an angle for making the second differential liquid filling holes 1461 be opposite to the first differential liquid filling holes 133 can facilitate the overflowing liquid fill into the framework 12 via the second differential liquid filling holes 1461 and the first differential liquid filling holes 133.

In order to modulate the liquid flow, as shown in FIG. 2, a middle liquid transmitting tube $L_{mid}$ is connected between the circulation pump 18 and the liquid input tube $L_{IN}$, and a branch liquid transmitting tube $L_{mod}$ is connected to the middle liquid transmitting tube $L_{mid}$ and one side of the liquid aging cask 11; wherein the disposing height of the branch liquid transmitting tube $L_{mod}$ is relatively higher than the height of the liquid level for the liquid stored in the liquid aging cask 11, such that the branch liquid transmitting tube $L_{mod}$ is able to fill the transmitted liquid into the liquid aging cask 11. Therefore, by the disposing of the branch liquid transmitting tube $L_{mod}$ and the middle liquid transmitting tube $L_{mid}$, an operator is able to activate the branch liquid transmitting tube $L_{mod}$ for directly fill the liquid into the liquid aging cask 11 when excessively-filled liquid in the second buffer space overflows into the first buffer space 131 of the first buffer trough 13.

Furthermore, as shown in FIG. 2 and FIG. 3, an observation window 11-OB is disposed on one side of the liquid aging cask 11 for the operator to observe whether the nano metal flakes get out of the framework 12 with the flowing of the liquid or not. In addition, a lighting device 11-LU is further disposed in the liquid aging cask 11 for oppositely positioning over the observation window 11-OB; therefore, by using the lighting device 11-LU, the operator is able to confirm the nano metal flakes mix with the liquid by observing a Tyndall effect occurring in the liquid.

Herein, it needs to stress that, although there has no liquid/gas flow controlling valves being introduced in above descriptions for the framework of the liquid catalyzing system, the person skilled in the field of liquid catalyzing system should know that: (1) the liquid circulation loop would commonly be provided with a plurality of liquid flow controlling valves, and the gas circulation loop would commonly be provided with a plurality of gas flow controlling valves. For the reasons, the liquid flow controlling valves and the gas flow controlling valves are merely illustrated in FIG. 2, but does not be introduced by literal words. Of course, gas circulation loop can also be disposed with pressure gauges and/or pressure modulating devices. Moreover, as shown in FIG. 2, a cask connecting tube $L_{bar}$ branching out from the middle liquid transmitting tube $L_{mid}$ does also need to be provided in the liquid circulation loop, used for transmitting the liquid pumped out of the liquid aging cask 11 to an external liquid storing cask.

Therefore, through above descriptions, the liquid catalyzing system used for aging a liquid proposed by the present invention has been introduced completely and clearly; in summary, the present invention includes the advantages of:

(1) Differing from conventional catalyzing systems using nano metal catalysts with supporting carrier or nano metal catalysts without supporting carrier to accomplish the catalytic reaction for the liquid, a plurality of nano metal flakes are adopted as an important catalyst and a novel liquid catalyzing system is particularly designed in the present invention for rapidly aging the liquid.

(2) Moreover, by using the liquid catalyzing system, the liquid can be evenly mixed with the nano metal flakes in a reaction space constructed by a framework and a filter of the novel liquid catalyzing system; in addition, a disturb gas is inputted to the reaction space through a gas circulation loop connecting with the framework for treating a liquid flow disturbance to the liquid and the nano metal flakes, so as to effectively accelerate a catalytic reaction resulted from the nano metal flakes to the liquid.

The above description is made on embodiments of the present invention. However, the embodiments are not intended to limit scope of the present invention, and all equivalent implementations or alterations within the spirit of the present invention still fall within the scope of the present invention.

What is claimed is:

1. A liquid catalyzing system used for aging a liquid, comprising:
    a liquid aging cask, being used for storing the liquid, and having an installing opening and a liquid outputting port on the top and the bottom thereof, respectively;
    a framework, being disposed in the liquid aging cask through the installing opening, and having a top end and a bottom end, wherein a plurality of nano metal flakes are disposed in the internal of the framework; moreover, the thickness of the nano metal flake is less than 200 nm, and the geometry size of the nano metal flake being greater than 0.1 µm$^2$;
    a filter, being attached onto the framework by covering way, and having a filter area less than 0.1 µm$^2$ for blocking the nano metal flakes from getting out of the framework with the flowing of the liquid;
    a first buffer trough, being connected to the installing opening by the outer bottom thereof; wherein the first buffer trough has a first buffer space, and a through hole is provided on the bottom of the first buffer space;
    a liquid filling member, being disposed in the first buffer space of the first buffer trough, and comprising:
        a second buffer trough; and
        a first liquid filling tube having a first end and a second end, wherein the first end passes through the second buffer trough from the bottom of the second buffer trough, so as to expose in a second buffer space of the second buffer trough; moreover, the second end is communicated with the framework via the through hole; in addition, the portion of the first end exposing out in the second buffer space being provided with a plurality of liquid filling holes thereon;
    a cover, being disposed on the first buffer trough for sheltering the first buffer space and the liquid filling member, and having an operation opening;
    a liftable cover, being disposed on the cover for covering the operation opening, wherein a second liquid filling tube is disposed on the liftable cover;
    a circulation pump, being connected to the second liquid filling tube and the liquid output port through a liquid input tube and a liquid output tube of a liquid circulation loop, respectively; and
    a gas circulation loop, comprising:
        a gas input tube, passing through the liquid aging cask so as to connect with a tube connecting member formed on the bottom end of the framework, and
        a gas output tube, being disposed on one side of the liquid aging cask, wherein the disposing height of the gas output tube is relatively higher than the height of a liquid level for the liquid stored in the liquid aging cask;
    wherein by the operation of the circulation pump, the liquid stored in the liquid aging cask would be discharged via the liquid outputting port and the liquid output tube, and then the discharged liquid would be further filled into the second buffer space of the second buffer through the liquid input tube and the second liquid filling tube; therefore, the liquid accommodated in the second buffer space of the second buffer would flow through the liquid filling holes formed on the first end of the first liquid filling tube, so as to flow into the framework;
    wherein a disturb gas can be filled into the framework via the gas input tube and the tube connecting member, and then the filled disturb gas would treat a liquid flow disturbance to the liquid and the nano metal flakes in the framework, so as to accelerate a catalytic reaction resulted from the nano metal flakes to the liquid; therefore, the disturb gas would be discharged from the liquid aging cask through the gas output tube.

2. The liquid catalyzing system of claim 1, wherein the liquid is selected from the group consisting of: alcoholic liquid, vinegar and soy sauce.

3. The liquid catalyzing system of claim 1, wherein the nano metal flake is stacked by a plurality of nano metal particles.

4. The liquid catalyzing system of claim 1, wherein the liquid circulation loop further comprises:
    a middle liquid transmitting tube, being connected between the circulation pump and the liquid input tube; and
    a cask connecting tube, being a branch tube of the middle liquid transmitting tube, and used for transmitting the liquid pumped out of the liquid aging cask to an external liquid storing cask.

5. The liquid catalyzing system of claim 1, wherein the liquid circulation loop is further provided with a plurality of liquid flow controlling valves, and the gas circulation loop is also provided with a plurality of gas flow controlling valves.

6. The liquid catalyzing system of claim 1, wherein a plurality of first differential liquid filling holes are disposed on the bottom of the first buffer space and surround the through hole.

7. The liquid catalyzing system of claim 1, wherein the framework further has:
    an upper supporting ring, being connected to the second end;
    a lower supporting ring, being connected to the tube connecting member; and
    a plurality of supporting rod, being connected between the upper supporting ring and the lower supporting ring.

8. The liquid catalyzing system of claim 1, wherein one side of the liquid aging cask is provided with an observation window thereon, and the observation window is for a user to observe whether the nano metal flakes get out of the framework with the flowing of the liquid or not.

9. The liquid catalyzing system of claim 3, wherein size of the nano metal particle is ranged from 2 nm to 30 nm.

10. The liquid catalyzing system of claim 3, wherein the nano metal particles are made of a high purity metal material through a physical vapor deposition (PVD) process.

11. The liquid catalyzing system of claim 4, wherein the liquid circulation loop further comprises a branch liquid transmitting tube connected to the middle liquid transmitting tube and one side of the liquid aging cask, and the disposing height of the branch liquid transmitting tube is relatively higher than the height of the liquid level for the liquid stored in the liquid aging cask, such that the branch liquid transmitting tube is able to fill the transmitted liquid into the liquid aging cask.

12. The liquid catalyzing system of claim 6, wherein the liquid filling member further comprising a liquid filling plate disposed on the first liquid filling tube and adjacent to the second buffer trough, wherein the liquid filling plate is provided with a plurality of second differential liquid filling holes thereon; therefore, when the excessively-filled liquid in the second buffer space overflows into the first buffer space, to rotate the liquid filling member by an angle for making the second differential liquid filling holes be opposite to the first differential liquid filling holes can facilitate the overflowing liquid fill into the framework via the second differential liquid filling holes and the first differential liquid filling holes.

13. The liquid catalyzing system of claim 8, wherein a lighting device is disposed in the liquid aging cask for oppositely positioning over the observation window; therefore, by using the lighting device, the user is able to confirm the nano metal flakes mix with the liquid by observing a Tyndall effect occurring in the liquid.

14. The liquid catalyzing system of claim 10, wherein the high purity metal material is selected from the group consisting of: gold, silver and platinum.

* * * * *